(12) United States Patent
Märk

(10) Patent No.: US 6,209,601 B1
(45) Date of Patent: Apr. 3, 2001

(54) WHEEL FOR A VEHICLE INCLUDING ENCLOSED HOLLOW FOAM MEMBER

(76) Inventor: Marco Märk, Baselstrasse 16, 4144 Arlesheim (CH)

( * ) Notice: Subject to any disclaimer, the term of this patent is extended or adjusted under 35 U.S.C. 154(b) by 0 days.

(21) Appl. No.: 09/252,198

(22) Filed: Feb. 18, 1999

(30) Foreign Application Priority Data

Feb. 24, 1998 (EP) .................................................. 98810145

(51) Int. Cl.$^7$ .................................................. B60C 17/00
(52) U.S. Cl. .......................... 152/158; 152/310; 152/312; 152/314; 152/322; 152/339.1; 152/512; 152/519
(58) Field of Search ...................... 152/157, 158, 152/159, 165, 166, 310, 312, 313, 314, 322, 339.1, 511, 512, 518, 519, 520

(56) References Cited

U.S. PATENT DOCUMENTS

| | | | |
|---|---|---|---|
| 1,329,872 | * 2/1920 | Wohlgemuth et al. | 152/313 |
| 1,585,875 | * 5/1926 | Price | 152/157 |
| 2,166,511 | * 7/1939 | Witzenmann | 152/157 |
| 3,022,810 | 2/1962 | Lambs . | |
| 3,331,423 | * 7/1967 | Guin | 152/313 |
| 3,574,317 | * 4/1971 | Brewer | 152/313 |

FOREIGN PATENT DOCUMENTS

| | | |
|---|---|---|
| 2544474 | 4/1977 | (DE) . |
| 1322887 | 2/1963 | (FR) . |
| 581810 | 10/1946 | (GB) . |
| 9749566 | 12/1997 | (WO) . |

* cited by examiner

Primary Examiner—Geoffrey L. Knable
(74) Attorney, Agent, or Firm—Brown & Wood, LLP

(57) ABSTRACT

The invention relates to a novel wheel which serves for equipping with a pneumatic tire and essentially realizes two apparently incompatible properties of solid rubber tires and pneumatic tires, namely strength and good shock absorption, in a single wheel. This wheel is distinguished by the fact that it has a toroidal hollow foam member enclosed by the pneumatic tire and comprising reversibly deformable material having a large number of enclosed cavities serving for the absorption of gas. The substantial advantage of the tire according to the invention is obvious. Damage to the tire skin by a stone or nail does not in fact inevitably lead to an immediate and complete loss of air, as is often the case with known tires. Thus, the toroidal hollow foam member can itself store air in its cells, which not only permits continued riding for a certain time but also reduces the risk of accidents in the event of damage to the tire. Further advantages of the tire according to the invention are that the sound-insulating properties of the foam reduce the running noises of the wheel and that the foam torus optionally enclosed in an inner tube is hollow inside, which simplifies the removal of the pneumatic tire from the rim.

7 Claims, 1 Drawing Sheet

WHEEL FOR A VEHICLE INCLUDING ENCLOSED HOLLOW FOAM MEMBER

BACKGROUND OF THE INVENTION

1. Field of the Invention

Wheels for motor vehicles, such as, for example, automobiles and motor cycles, and wheels for motorassisted bicycles, bicycles, trailers and hand carts have a rim in which a tire of natural or synthetic rubber is inserted. Depending on the type of tire, either pneumatic tires or solid rubber tires are used here.

Depending on the type of vehicle and load limit, one or other type of tire is preferred, a solid rubber tire having the advantage over the use of pneumatic tires that it requires virtually no maintenance and is insensitive to minor damage to the tire skin. On the other hand, pneumatic tires have the advantage that they are suitable for higher speeds and have better shock absorption.

2. Description of the Prior Art

Known pneumatic tires have a substructure, also referred to as the carcass, consisting of a certain number of crossed layers of reinforcing fibers, such as, for example, silk, polyamide or metal. The carcass may have a multi-layer form, at least one layer consisting of a dense weave of reinforcing fibers for protection from external damage.

The wheels intended for equipping with pneumatic tires may alternatively be formed with or without an inner tube. Wheels without a separate inner tube require that the space between the rim and the pneumatic tire be sealed air-tight, as, for example, in the case of automobiles.

In the case of bicycles, which preferably have wheels with an inner tube, the total energy which is required for movement is supplied by the rider's muscles. In this case, tire designers therefore pay particular attention to low tire weight and to minimum resistance to rolling. The result of this is that in particular tires for bicycles can be very easily damaged owing to a lack of strength and that even slight damage to the tire skin leads to damage to the inner tube and hence to immediate and complete loss of air, which finally prevents further riding.

SUMMARY OF THE INVENTION

The invention relates to a novel wheel which serves for equipping with a pneumatic tire and realizes the above-mentioned, apparently incompatible properties of solid rubber tires and pneumatic tires, namely strength, ease of maintenance, suitability for high speeds and good shock absorption, in a single wheel. This wheel is characterized in that it has a toroidal hollow foam member of reversibly deformable material with a large number of cavities which serve for absorbing gas, in particular air.

BRIEF DESCRIPTION OF THE DRAWINGS

The invention is described in more detail below with reference to the attached drawings. In the drawings.

DESCRIPTION OF THE PREFERRED EMBODIMENTS

Figure 1:
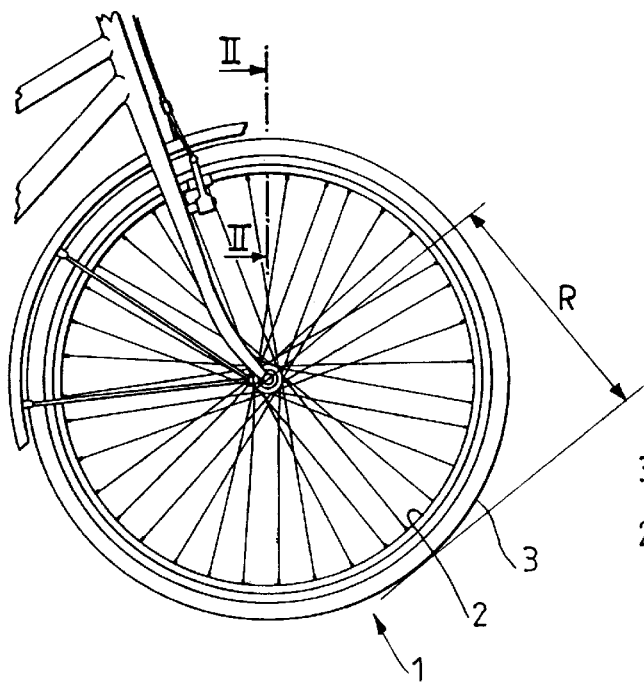
FIG. 1 shows a front wheel of a bicycle.
Figure 2:
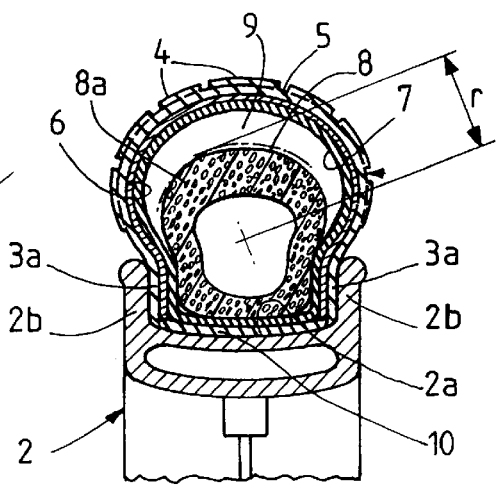
FIG. 2 shows a section along the line II—II of FIG. 1, on a larger scale with inflated tire.

The bicycle tire shown in FIGS. 1 and 2 shows the wheel denoted as a whole by 1 and having a rim 2 and a pneumatic tire 3. The associated air valve is not shown.

As incidentally with all vehicle rims known on the market, the rim 2 is standardized and has predetermined dimensions for the rim width, flange height and flange width. The pneumatic tire 3 tailored to the rim dimensions consists in a known manner of an elastomeric material, such as, for example, of natural or synthetic rubber or of a suitable thermoplastic. As is evident from FIG. 2, the pneumatic tire 3 has, on its outside, a tread 5 forming the tire engraving 4 and, on its inside, a carcass 6 formed from reinforcing fibers.

The pneumatic tire 3 fits in the rim base 2a, and does so in such a way that its edges 3a rest tightly against the flange edges 2b of the rim 2. An inner tube 7 is arranged in the space bounded by the tire 3 and rim base 2a, and a toroidal hollow foam member 8 is additionally arranged in said inner tube. Said hollow foam member fills approximately ⅔ (30 to 90%) of the space between tire wall and rim base 2a in the pressureless state and fits in the rim base 2a in the inflated state ready for riding. The hollow foam member is moreover dimensioned so that a space 9 containing compressed air can form between the tread 5 forming the tire engraving 4 and the hollow foam member 8, with the result that a pneumatic pressure constant over the total circumference of the wheel 1 is generated in the inflated state.

For constant pressure distribution, the toroidal hollow foam member 8 consists of a reversibly deformable plastic having a large number of closed cavities serving for air absorption. The cavities also referred to below as cells 8a occupy a larger or smaller volume depending on the air pressure applied.

In particular, a polymeric organic material according to German DIN standard 7724, in the form of a closed-cell foam according to German DIN standard 7726, serves as the material for the formation of the toroidal hollow foam member 8. An essential feature of the soft or semihard, closed-cell materials which can be used according to the invention is that they can be compressed under the action of an external pressure and relax again with a subsequent decrease in pressure, and do so in such a way that they assume approximately the original state again when the applied pressure is completely eliminated. On compression, the plastic thus generates an opposite pressure, as explained below. Here, plastics which can be preferably used exhibit the physical behavior according to ISO standard 844 and, on 10% compression, generate an opposite pressure of about 20 kPa. Examples of such materials are plastics or plastics blends treated with a blowing agent or expanded using a gas or air, such as, for example, crosslinked or uncrosslinked polyolefins, for example polyethylene, or polyvinyl chloride, polyurethane and natural or synthetic rubbers. To ensure that the foam member which can be used according to the invention has a relatively high load-bearing capacity, it is preferably mounted in an inflated inner tube 7 or pneumatic tire 13 ready for riding, which inner tube or tire serves as a pressure chamber. Consequently, compressed air diffuses into the cells 8a. The gas or the air in the cells 8a is thus under a pressure which is greater than atmospheric pressure, with the result that the above-mentioned opposite pressure amounting to 20 kPa can be increased several-fold.

For the production of an inner tube enclosing, according to the invention, a toroidal hollow foam member, a commercial tube is first cut open and the tube cut open in this manner is detachably fastened at least at its two ends in an extended position in an evacuating tube. Reduced pressure is then generated in the space between evacuating tube and tube, with the result that the extended tube expands radially. A tubular foam member can be inserted into the tube member under tension in this way and, after elimination of the reduced pressure, first the foam tube can be welded or adhesively bonded together to give a toroidal member and then the tube can be adhesively bonded along its cut surfaces, which can be effected, for example, by means of a vulcanizable tape. Bicycle tubes which are particularly suitable for receiving a toroidal hollow foam member are, for example, the tubes of the AIRSTOP type, which are available under the trade name MICHELIN. The physically crosslinked polyethylene foams known under the trade names ALVEOLIT (type TA3000) and ALVEOLEN (type NA3300) are particularly suitable for the production of the toroidal hollow foam member. For this purpose, a suitable foam web is cut from a sheet material of the desired thickness and is shaped into a tube by adhesive bonding or welding together. The production of the tube from sheet material has the advantage that the deformability is improved by the compression of the foam against the inside of the tube, which is advantageous especially in the case of strong flexing.

Figure 4:
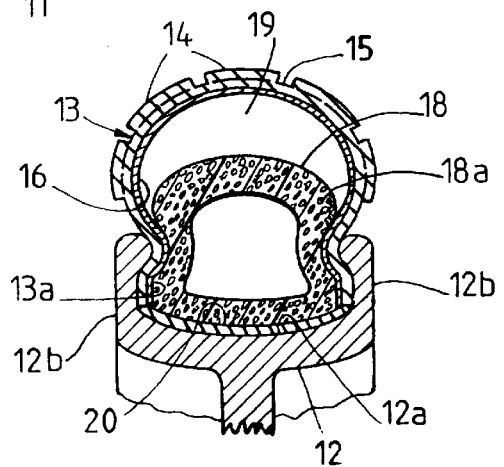

In the case of toroidal hollow foam members, R approximately describes the wheel radius and r approximately describes the external radius, shown in cross-section II or IV in FIGS. 1 and 4, of the foam tube before insertion into the pneumatic tube. If the ratio R:r is less than 10 for a tire, it may be advantageous to produce the torodial hollow foam member from two or more foam webs.

Furthermore, foam having bubbles which are oval in the longitudinal direction is preferably used. These bubbles have for example a longitudinal axis which is twice as long as the diameter of the bubbles. This ensures that the increase in the volume of the foam occurs mainly at 90° to the longitudinal axis of the bubbles, i.e. it is not so much the wheel circumference R that is increased as the width of the foam tube, which width is dependent on r.

In the relaxed state, the tube preferably has a smaller cross-section than the toroidal hollow foam member. The toroidal hollow foam member enclosed in the tube is thus exposed to a continuous pressure from the tube in the uninflated state, with the result that the hollow foam member is compressed and releases enclosed air into the space between torus and tube until a pressure equilibrium is reached. The tube cross-section reduced relative to the cross-section of the toroidal hollow foam member moreover facilitates the mounting of the tube on the rim.

For the production of the bicycle tire shown in FIGS. 1 and 2, a rim tape 10 is first drawn onto the rim base 2a. A first tire bead is then pushed over a rim flange. The inner tube 7 containing a toroidal hollow foam member 8 is then inserted into the tire base still partly projecting from the rim 2, said inner tube is then pressed together with the second tire bead into the rim base 2a and the tube 7 is fastened to the rim 2, which can be preferably effected by means of the air valve not shown. The tube 7 is then pumped up with air (which results in compression of the toroidal hollow foam member 8) until the desired tire pressure is reached.

The load-bearing capacity of a pneumatic tire is dependent on the tire pressure, said capacity increasing with increasing bearing surface and increasing air pressure and decreasing with increasing travelling speed. The optimum tire pressure is thus dependent not only on the vehicle type but also on the desired load-bearing capacity or load limit. It is about 8 bar for racing cycles, about 2.5 bar to 3.5 bar for mountain bikes and motor-assisted bicycles and about 2 bar to 3 bar for middle-of-the-range cars.

On inflation of the inner tube 7, the toroidal hollow foam member 8 is—depending on the gas or air pressure in the cells 8a—initially compressed during a pumping process, the cavities or cells 8a becoming smaller and the foam member shrinking. However, the inflation also produces a resistance on the side of the foam member 8 so that, owing to the resulting pressure difference, air subsequently diffuses into the cells 8a until an equilibrium dependent on the properties of the hollow foam member 8 under pressure and the tire pressure produced is reached. The mass of the enclosed gas in the completely inflated equilibrium state can, depending on the pressure applied, then be more than 20% greater than in the uninflated state. Consequently, the hollow foam member occupies a larger volume on relaxation to atmospheric pressure than before its presence in the pressure chamber.

As a result of the above-described behavior of the hollow foam body 8 during pumping up of the tire, the former sits in the rim base 2a and leaves a space facing the tread 5 and containing compressed air. This has the advantage that the tire treated according to the invention has exactly the same travelling characteristics as an untreated bicycle tire and accordingly has a relatively low resistance to rolling.

In this context, it should be mentioned that pneumatic tires which contain a toroidal hollow foam member and, in said member, an inner tube under pressure are disclosed, for example, in US-A 3 331 423 and DE-A 1 936 526. In these two types of tire, the foam is thus outside the pressure chamber. With these previously known tires, too, an attempt is made to combine the apparently incompatible properties of solid rubber tires and pneumatic tires with one another. However, this has the substantial disadvantage that the inner tube exerts a continuous pressure on the foam in this arrangement, with the result that the gas diffuses out of the cells and the foam irreversibly decreases in volume and that such tires have a relatively high resistance to rolling, which is known to be undesirable for bicycles and motor-assisted bicycles.

Figure 3:
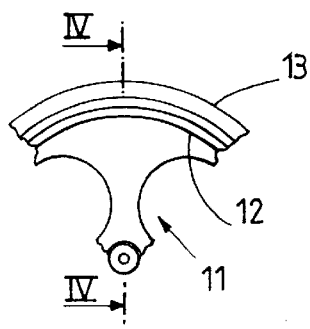
FIG. 3 shows a partial view of a vehicle tire which manages without a separate inner tube and FIG. 4 shows a section along the line IV—IV of FIG. 3, on a larger scale with inflated tire.

FIGS. 3 and 4 show a second possibility for equipping a vehicle with tires, namely one which has no separate inner tube, as is already known, for example, for motor cycles and cars. Here, the wheel 11 shown in these figures has a spokeless composite rim 12 of, for example, metallic material and a pneumatic tire 13. The latter has, on its outside, a tread 15 forming the tire engraving 14 and, on its inside, a carcass 16 formed from reinforcing fibers. The pneumatic tire 13 moreover fits in the rim base 12a, and does so in such a way that its edges 13a fit tightly against the flange edges 12b and against the rim tape 20 and seal air-tight the space enclosed by the tire 13. In the space bounded by the tire 13 and rim base 12a, the hollow foam member 18 according to the invention is arranged and optionally additionally fastened. In the inflated state of the wheel, said hollow foam member is under pressure and—like the hollow foam member 8—fits in the rim base 12a, i.e. leaves a space 19 filled with compressed air and adjacent to the tread 15.

The substantial advantage of the tire according to the invention is obvious. Damage to the tire skin and to any inner tube present by a stone or nail does not in fact inevitably lead to an immediate and complete loss of air. Thus, the toroidal hollow foam member 8 or 18 has the property of retaining or storing air in the cells 8a. The air stored in the hollow foam member 8 will in fact escape only slowly, if at all, in the event of local damage to the tire 3 or inner tube 7. In addition, in the event of damage to the tire 3 or 13 and/or to the inner tube 7, the air pressure in the tube 7 or in the pneumatic tire 3 or 13 decreases and the toroidal hollow foam member 8 or 18 then expands and thus at least partly compensates the air loss in the inner tube 7 or pneumatic tire 13. In the event of damage to the tire according to the invention, air thus still remains stored in the toroidal hollow foam member 8 or 18 for at least a certain time, which not only permits continued riding for a certain time but also reduces the risk of an accident in the event of damage to the tire.

Especially when equipping a bicycle with tires, the tire according to the invention additionally increases the strength of the wheel. Thus, the shock absorbing properties of the plastic reduce the risk of damage to the inner tube through jamming of said tube between a sharp-edged obstacle, such as, for example, a kerbstone, and the rim. This can be explained in particular by the fact that the toroidal hollow foam member 8 does not yield on running over a kerbstone, which would permit jamming of the inner tube, but is compressed by the pressure of running over said kerbstone and thus hardens.

Further advantages of the tire according to the invention are that the sound-insulating properties of the plastic which can be used according to the invention reduce the running noises of the wheel and that the foam torus enclosed in the inner tube makes it unnecessary partly to pump up the tube for pulling the inner tube onto a rim. Moreover, the cavity in the toroidal hollow foam member according to the invention gives rise to a weight reduction. Said cavity furthermore ensures that the foam torus rests tightly against the inner surface of the tire wall in the event of a pressure loss and facilitates removal of the tire from the rim after the above-described volume increase due to the gas diffusion. It is in this respect that the toroidal hollow foam member differs from the previously known patents or Laid-Open Applications US-A 4 058 152, FR-A 2 236 674, WO 91/10705 or US 581 810.

Finally, experiments have also shown that the expansion of the toroidal hollow foam member 8 or 18 in the event of a sudden loss of air is dependent not only on the physical properties of the foam but also on the maximum pneumatic pressure acting on the hollow foam body 8 or 18. Thus, it has been found that, in the case of a maximum pneumatic pressure of 2 to 5 bar, the expansion of the toroidal hollow foam member 8 or 18 continues at least to the original, uncompressed form.

Finally, it should be pointed out that the tires described with reference to FIGS. 1 to 4 represent only a selection of several possible embodiments of the invention and can be modified in various respects.

Thus, the tire according to the invention can be provided not only for bicycles but also for motor-assisted bicycles, trailers, hand carts, wheelchairs, motor cycles and automobiles, and also for other motor vehicles or aircraft which are preferably equipped with pneumatic tires.

What is claimed:

1. A wheel for a vehicle, comprising a rim having a rim base; a pneumatic tire inserted in the rim base; and a toroidal hollow foam member enclosed by the pneumatic tire with formation of an air chamber therebetween, the toroidal hollow foam member being formed of a reversibly deformable material having a large number of gas-absorbing closed cavities, the reversibly deformable material compressing under an inflation action and relaxing after an end of the inflation action to a volume larger than a volume thereof before a start of the inflation action, whereby the air chamber between the toroidal hollow foam member and the pneumatic fire is filled with a compressed air in an inflated state.

2. The wheel as claimed in claim 1, wherein the material of the toroidal hollow foam member consists of at least one of the following plastics or plastics blends: crosslinked or uncrosslinked polyolefins, polyvinyl chloride, natural or synthetic rubbers.

3. The wheel as claimed in claim 1, wherein the toroidal hollow foam member is fastened to the rim.

4. The wheel as claimed in claim 1, wherein the hollow foam member is enclosed in an inner tube of the pneumatic tire.

5. The wheel as claimed in claim 4, wherein the inner tube is fastened to the rim.

6. The wheel is claimed in claim 1, wherein the annular hollow foam member fits in the rim base in the inflated state of the tire.

7. An inner tube for a pneumatic tire, comprising a tubular member; and a toroidal hollow foam member enclosed by the tubular member with formation of an air chamber there between, the toroidal hollow foam member being formed of a reversibly deformable material having a large number of gas-absorbing closed cavities, the reversible deformable material compressing under an inflation action and relaxing after an end of the inflation action to a volume larger than a volume thereof before a start of the inflation action, whereby the air chamber between the toroidal hollow foam member and the tubular member is at least partially filled with a compressed air in an inflated state.

\* \* \* \* \*